3,428,558
METHOD OF CLARIFYING WATER AND COMPOSITIONS USED THEREFOR
John Phillip Murphy, 346 Morning View Ave.,
Akron, Ohio 44305
No Drawing. Filed July 25, 1967, Ser. No. 655,751
U.S. Cl. 210—59                                15 Claims
Int. Cl. B01d 21/01

ABSTRACT OF THE DISCLOSURE

This invention is directed to a composition for treating water and more specifically to a method of dispersing high-molecular weight water-soluble polymers in water by means of gasogenic agents. The composition comprises an admixture of said high-molecular weight polymers and a gasogenic agent. The gasogenic agents comprise an acidic compound and a $CO_2$-releasing compound wherein the $CO_2$-releasing compound is selected from the group consisting of ammonium carbonates and bicarbonates and the alkali and alkaline earth metal carbonates and bicarbonates. The acidic compound is selected from the group consisting of solid organic acids having 2 to 20 carbon atoms per molecule, the anhydrides and the acid salt thereof, the inorganic acid salts, the alums, e.g., aluminum sulfate, and various mixtures thereof.

---

This invention is directed to a composition for treating water and more specifically to a method of dispersing high-molecular weight water soluble polymers in water by means of a gasogenic agent. Still more specifically, this invention is directed to a method of clarifying natural sources of water, which contain finely-divided solids suspended therein, by means of dispersing in the water a high-molecular weight polymer in combination with a gasogenic agent. Still further, this invention is directed to gasogenic agents capable of releasing carbon dioxide as means of dispersing high-molecular weight water-soluble polymers in water, and more particularly water which contains finely-divided suspensions of muds, slimes, inorganic materials, and various combinations of materials normally found in raw water.

Presently, it is known that various high-molecular weight polymers may be used for treating industrial waste waters, in addition to the natural-occurring water, e.g., water taken from rivers, lakes and the like, to make it suitable for various industrial applications. Presently, large volumes of natural-occurring water are being used as cooling mediums, for example, in systems such as condensers, cooling towers, boiling plants, petroleum refining equipment, water-cooling jackets, and other water systems comprising pipes, tubes, pumps and the like. However, prior to using natural-occurring water, e.g., river water, etc., for many of these applications, it is necessary to remove or treat the solids, i.e., muds, slimes, etc., which are normally in suspension. Thus, to make large volumes of raw water available for use in industrial equipment, it is possible to treat the mud and water by adding thereto these known water-soluble polymers. These polymers may be used effectively to coagulate the suspended matter, e.g., mud, etc., and thereby provide a source of water for use in industrial equipment, particularly water-cooling systems and the like, as shown, for example, in U.S. Patent No. 3,184,336.

While a number of these known water-soluble polymers are effective for treating the suspended matter, their molecular weights are sufficiently high so as to make it difficult to solubilize them. It has been found, in accordance with this invention, that the high-molecular weight polymers of ethylene oxide and acrylic polymers may be dispersed in water by utilizing in combination therewith a gasogenic agent capable of releasing a gas. Thus, it is possible to utilize these polymers for this purpose in the form of a solid, i.e., powder, instead of a solution which would require the handling of a large volume of diluent. By combining the high-molecular weight solid polymers with the gasogenic agents in the stated proportions, it is possible to disperse or solubilize said polymers in the water at a comparatively rapid rate. Moreover, since there are a variety of other uses for aqueous solutions of these high-molecular weight polymers, it has become increasingly more important to find a means whereby these polymers may be dispersed or solubilized in water without any great difficulty.

In general, these polymers are difficult to dissolve because of their inherent chemical and physical characteristics. The two primary factors which influence or determine the ease of solubility are the particle size and wettability which is determined by the chemical constituents. Thus, for example, the more finely-divided polymeric materials will dissolve more quickly than the less finely-divided materials. Likewise, materials containing functional groups of a nature similar to the solvent tend to dissolve more quickly than the materials which contain groups dissimilar to the solvents.

A somewhat contradictory circumstance arises, however, when high-molecular weight polymers with inherent soluble constituents are finely-divided. These polymers are difficult to dissolve because of their soluble nature. For example, when a particle of the polymer is wetted by the solvent, it swells and then partially dissolves; the outer layer of said particle dissolving more quickly than the inner portion thereof. In the period between the wetting and completely dissolving, the outer portion of the particle becomes sticky or cohesive such that the particles cling together. This cohesiveness between the particles depends on the rate of solution of the particular polymer which, in turn, depends on the particle size and chemical structure. Normally, under ordinary circumstances, powdered, water-soluble polymers of high-molecular weights are difficult to dissolve in water in that they tend to clump or form larger particles which are difficult to dissolve.

Accordingly, to avoid these problems and to provide a means for dispersing high-molecular weight polymers in the water, it has been found that the presence of a gasogenic agent in admixture with the polymers provides a liberating gas, i.e., carbon dioxide, which in the presence of water, prevents agglomeration of the polymeric particles and disperses them so as to increase the rate of solubility.

Thus it is an object of this invention to provide a water-treating composition comprising at least one high-molecular weight, water-soluble polymer and an effective amount of a gasogenic agent comprising a carbon dioxide-releasing compound and an acidic compound.

It is another object of this invention to provide a method of dispersing high-molecular weight, solid polymers in water by means of a gasogenic agent comprising a carbon dioxide-releasing compound and an acidic compound.

It is another object of this invention to provide a water-treating composition which may be used effectively for treating raw water containing finely-divided, suspended matters, said water-treating composition comprising a water-soluble solid polymer and a gasogenic agent.

It is still another object of this invention to provide a method of treating water containing suspensions and accumulations of muds, slimes, etc., by incorporating in said water an effective amount of a water-treating composition comprising an admixture of a gasogenic agent and a high-molecular weight polymer in the form of a powder.

These and other objects of the invention will become apparent from a further and more detailed description to follow.

It has been found that solid, high-molecular weight polymers of ethylene oxide and acrylic polymers may be dispersed in water by means of a gasogenic agent. More particularly, it has been found that the addition of the water-treating compositions of this invention to large volumes of raw water enables the substantially clarified water to be used for a variety of industrial purposes without regard to the problems normally encountered heretofore caused by the accumulation of muds, slimes, etc. The amount of polymer treatment, of course, will vary depending upon the amount of mud and slime, etc. present in the water. Normally, the water-soluble polymers are incorporated in the water in amounts ranging from about 0.001 to about 2,000 parts by weight of polymer per million parts by weight of water. More preferably, the polymers may be added in amounts ranging from about 0.001 to 1000 parts by weight of the polymer per million parts by weight of the water. Thus, it has been found that it is possible to effectively disperse and solubilize high-molecular weight polymers in water in the form of a solid by using in combination with the polymer an effective amount of a gasogenic agent. The addition of the gasogenic agent in the presence of the high-molecular weight polymer to the water causes the releases of a gas, i.e., carbon dioxide, which disperses the polymer so as to prevent agglomeration of polymer particles and improve the rate of solubility.

The gasogenic agents to be used in combination with the water-soluble polymers comprises an acidic compound and a carbon dioxide-releasing compound. The acidic compounds are selected from the group consisting of solid (1) organic acids having $C_2$–$C_{20}$ carbon atoms per molecule, the anhydrides and acid salts thereof, (2) the acid salts of inorganic acids and (3) the alums.

The carbon dioxide-releasing compounds are selected from the group consisting of ammonium carbonates, ammonium bicarbonates, alkali and alkaline earth carbonates, and the alkali and alkaline earth bicarbonates. The $CO_2$-releasing compounds are present in admixture with the acidic compounds in amounts ranging from about 0.05 to 20 and more preferably 0.1 to 10 equivalents of the $CO_2$-releasing compound per equivalent of the acidic compound.

The relative proportions of the gasogenic agent with respect to the high-molecular weight polymers to be dispersed in the water may vary depending upon the dispersant and the nature of the polymer. In general, however, the water-treating composition comprises 0.01 to 20 and more preferably, 0.1 to 10 parts by weights, of the gasogenic agent for each part by weight of the high-molecular weight polymer to be dispersed in the water.

The water soluble polymers which may be dispersed in water by means of the gasogenic agents of this invention are selected from the group consisting of high-molecular weight polymers of ethylene oxide and the polymers of monomers characterized by the formula:

wherein R is selected from the group consisting of nitrile, amide, and carboxyl radicals. The carboxyl radicals may be further characterized as COOM wherein M is selected from the group consisting of lower alkyl radicals having 1 to 4 carbon atoms and metals which form water soluble salts with the carboxyl radicals. The polymers to be dispersed in water in accordance with this invention include polymers of ethylene oxide having an average molecular weight ranging from 100,000 to 20 million and more preferably, ranging from 1 million to 16 million. Likewise, the acrylic polymers may have molecular weights ranging up to about 20 million and more preferably, average molecular weights ranging from 1 million to 16 million.

The aqueous solutions of the ethylene oxide polymers, for example, e.g., molecular weights of 4 million in concentrations of about 1% and 2%, have viscosities ranging from about 2–4,000 centipoises at 25° C. and 30–40,000 centipoises at 25° C. respectively. These polymers are nonionic in aqueous mediums in that they do not contain recurring units of one or more ionizable groups. Instead, the polymers of ethylene oxide may be characterized as having recurring ether oxygen which, it is believed, have unshared electrons that coordinate with the electron acceptors, i.e., of the suspended matter in the water, forming bonds which, in turn, change the characteristics of the materials suspended so that they may be easily removed.

The acrylic polymers to be used in combination with the gasogenic agents are characterized as being polymers of monomers having the formula C=C—R and include polymers of acrylic or methacrylic acid and derivatives thereof. Included, for example, are acrylic acid, the alkali metal and ammonium salts of acrylic acid, methacrylic acid and the alkali metal or ammonium salts thereof. In addition, other acrylic polymers include acrylamide, methacrylamide, the N-alkyl-substituted amides, N-aminoalkyl amides, the amino-alkyl acrylates, amino-alkyl acrylamides, the alkyl-substituted amino-alkyl esters of acrylic and methacrylic acids, etc. In addition, the polymers may include homopolymers and the copolymers such as copolymers with monomers such as ethylene, propylene, isobutylene, vinylacetate, styrene, alkyl ether, acrylonitrile, methacrylonitrile, vinylchloride, acrylates, alkyl methacrylates alkyl maleates, and other olefinic monomers which are copolymerizable. Of these copolymers, however, the preferred include compounds wherein at least 50 mol percent of the acrylic or methacrylic acid derivatives are present. These hydrophilic polymers may be prepared by direct polymerization or copolymerization of one or more of the various monomers with aliphatic unsaturation if said compounds contain hydrophilic groups, e.g., carboxyl groups, etc. Moreover, these polymers can be obtained by subsequent reaction such as, for example, polymers which contain the nitrile group may be hydrolyzed to form the water soluble amide and carboxy-containing polymers. Likewise, copolymers of maleic anhydride and vinylacetate may be hydrolyzed to form polymers containing hydrophylic lactam rings. Still other hydrophylic polymers may be obtained by hydrolysis of copolymers of vinylacetate wherein the acetyl groups are removed, leaving hydroxyl groups which promote solubilization effect of the polyelectrolytic groups present.

Thus, the various polymers which may be utilized and referred to as acrylic polymers include the ethylenic polymers having various side chains distributed along a substantially linear, continuous carbon molecule. These side chains may be hydrocarbon groups, carboxylic acid groups, and various derivatives thereof including sulfonic acid groups, phosphoric acid groups, amino-alkyl groups, alkoxy groups, and various other organic groups, the number of which and the relative proportion of hydrophylic and hydrophobic groups being such as to provide a water-soluble polymer having a substantially large number of ionizable radicals.

Among the various polymers and water-soluble salts thereof useful in the practice of the invention, there may be included hydrolyzed polyacrylonitrile and polyacrylamide, sulfonated polystyrene, acrylamide acrylic acid copolymers, polyacrylic acid, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, methacrylic acid dimethylaminoethyl methacrylate copolymer, sodium polyacrylate-vinyl alcohol copolymer, hydrolyzed methacrylic acid-acrylonitrile copolymer, ethyl acrylate maleic anhydride copolymer, hydrolyzed acrylonitrile vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc.

Polymers containing cationic groups are, for example, ethyl acrylate and acrylamide-propylbenzyldimethylammonium chloride, copolymers of methyl acrylamide and acrylamidepropylbenzyldimethylammonium chloride, copolymers, of butadiene and 2-vinyl pyridine, and quaternary compounds such as polydimethylaminostyrene quaternized with benzyl chloride, allyl chloride, etc., and quaternized copolymers of vinyl alcohol and morpholinyl-ethyl-vinylether and the like.

The molecular weights of these polymers are fairly ambiguous. They may be as low as 100,000 and range over 8 to 16 million. As long as the polymers are sufficiently low in molecular weight, however, to be water soluble, they have the characteristics required. Polymers having molecular weights well over 8 million have this solubiilty. Viscosity measurements particularly intrinsic viscosity determinations are particularly effective in attempting to determine the molecular weights in this range.

The water-treating composition of this invention, as indicated, comprises a homogeneous mixture of the above-mentioned water-soluble high molecular weight polymers and a gasogenic agent consisting essentially of a $CO_2$-releasing compound and an acidic compound, in the ratio of approximately 0.05 to 20 equivalents of the $CO_2$-releasing compound per equivalent of the acidic compound. The $CO_2$-releasing compounds comprise the ammonium and metal carbonates or bicarbonates of metals selected from Groups I and II of the Periodic Table. Preferably, however, the carbonates and bicarbonates are alkali metal salts such as sodium carbonate, sodium bicarbonate, potassium carbonate, potassium bicarbonate, sodium carbonate decahydrate, potassium carbonate decahydrate, sodium carbonate monohydrate, hydrates of sodium and potassium bicarbonate, hydrates of potassium carbonate, sodium-potassium carbonate, lithium carbonate, magnesium carbonate, calcium carbonate, barium carbonate, and various other carbonates and bicarbonates such as ammonium carbonate, ammonium bicarbonate, etc.

The acidic compounds to be used in combination or in admixture with the $CO_2$-releasing compounds include the solid, organic acids having 2 to 20 carbon atoms per molecule, the anhydrides and the acid salts thereof, such as, for example, citric acid, aconitic acid, citaconic acid, maleic acid, fumaric acid, tartaric acid, phthalic acid, trimellitic acid, pyromellitic acid, glutaric acid, adipic acid, azelic acid, sebacic acid, pimellic acid, suberic acid. In addition to these, others which may be employed include abietic acid, acetone diacetic acid, acetone dicarboxylic acid, acetyl benzoic acid, acetylmalic acid, acetylsalicylic acid, acetyl benzoic acid, acetyl amino benzoic acid, acetylene dicarboxylic acid, aconitic acid, adipic acid, anthranilic acid, amylmalonic acid, aniline disulfonic acid, anthraquinone carboxylic acid, anthraquinone sulfonic acid, arabonic acid, ascorbic acid, aspartic acid, atropic acid, benzene sulfonic acid, benzene tetracarboxylic acid(s), benzene tricarboxylic acid (mellitic, trimellitic, trimesic), benzilic acid, benzoic acid, benzoic anhydride, benzoyl acetic acid, benzoyl benzoic acid, bromoacetic acid, bromocrotonic acid, chloroacetic acid; chlorodinitrobenzoic acid, citraconic acid (methyl-maleic acid) or (anhydride), citric acid, cyanoacetic acid, a-crotonic acid, fumaric acid, furoic acid, gluconic acid, glutaric acid, glycolic acid, glyoxylic acid, hydroxybenzoic acid (salicyclic acid), itaconic acid, maleic acid or anhydride, malonic acid, oxalic acid, phenolsulfonic acid, phthalic acid, pimelic acid, pyridine dicarboxylic acid, succinic acid and anhydride, sulfobenzoic acid, tartaric acid, p-toluenesulfonic acid, xylenesulfonic acid, aceturic acid, aconic acid, benzene tetracarboxylic acid, benzene hexacarboxylic acid, croconic acid, gallic acid, a-isomalic acid, levulinic acid, maleamic acid, malic acid, mellitic acid, oxamic acid, pivalic acid, saccharic acid, tiglic acid.

In addition to the solid, organic acids, as described above, it was found that $CO_2$ may be liberated from the carbonates and bicarbonates by using the alums or any combinations thereof which hydrolyze in the presence of water to yield the corresponding acid. The acid reacts with the carbonate, releasing the carbon dioxide which disperses the polymer. These alums include, for example, aluminum sulfate, aluminum sulfate hydrate, alum-ammonium, alum-ammonium-iron, alum-potassium-iron, alum-sodium, and various mixtures thereof. In addition, the acid salts of inorganic acids, are capable of releasing carbon dioxide from the carbonates and bicarbonates and include, for example, ammonium acid phosphate, potassium bisulfate, potassium acid sulfite, the alkali and alkaline earth metal bisulfates, the alkali and alkaline earth metal bisulfites, sodium acid phosphite and various mixtures thereof.

In combination with the water-soluble polymers, the preferred gasogenic agents include the alkali metal carbonates and bicarbonates containing one or more of the above-mentioned solid, organic acid alums, and/or inorganic acid salts. Thus, for example, a mixture of sodium bicarbonate with citric, fumaric or tartaric acid, and combinations thereof, may be employed, in the stated proportions, as a gasogenic agent. In the presence of water, these compounds react with the evolution of carbon dioxide which disperses the polymer in the water at a rapid rate. The alkali and alkaline earth metal carbonates, bicarbonates and ammonium carbonates and bicarbonates may be used in combination with the acidic compound in amounts ranging from about 0.05 to 20 and more preferably, 0.1 to 10 equivalents of the $CO_2$-releasing compound per equivalent of the acidic compound, e.g., citric or tartaric acid.

Typical examples of the water-treating compositions of this invention which may be used to disperse the polymers in water are illustrated below.

Example 1

Parts by wt.
Polymer of ethylene oxide (average molecular weight four million) _____ 1
Sodium bicarbonate _____ 2
Citric acid _____ 1

Example 2

Polymer of ethylene oxide (average molecular weight four million) _____ 1
Citric acid _____ 2
Sodium bicarbonate _____ 2

Example 3

Polyacrylamide (molecular weight one to four million) _____ 1
Citric acid _____ 2
Sodium bicarbonate _____ 2

In preparing the above compositions, it is important that all of the ingredients be substantially free of water and in the form of powder. The powdered mixture may be converted to small tablets, e.g., 5.0 grams, by employing methods well known in the art. Moreover, the tablets may be prepared by utilizing pharmaceutical methods including the use of coated tablets, so as to improve the shelf-life of the gasogenic agent.

The use of gasogenic agents for purposes of dispersing high-molecular weight polymers in water in accordance with this invention is further illustrated by the data in the following table. The mixture of the gasogenic agents and the polymers were added to the water in the form of powder at water temperatures of about 75° F. with the following observations:

The composition as prepared in Table I was repeated except that the gasogenic agent was in the form of pellets of ½" in diameter. The water was heated to a temperature of about 150–155° F. and the pellets containing approximately 1% of the polymer were added to the water with the following results:

TABLE I.—POWDER COMPOSITION

| Polymer of Ethylene Oxide | Parts by Weight | Carbonate | Parts by Weight | $CO_2$ Liberating Agent | Parts by Weight | Dispersion Time, Min. | Dispersion (at 75° F. of 0.5% Resin in Water) |
|---|---|---|---|---|---|---|---|
| (1) Same | 3.3 | $NaHCO_3$ | 7.7 | Citric Acid | 7.7 | 2 | Complete. |
| (2) Same | 3.3 | $NaHCO_3$ | 7.7 | Oxalic acid | 5.0 | 2 | Do. |
| (3) Same | 3.3 | $NaHCO_3$ | 7.7 | $NaH_2PO_4 \cdot H_2O$ | 7.5 | 1 | Do. |
| (4) Same | 3.3 | $NaHCO_3$ | 7.7 | $NaHSO_3$ | 8.0 | ½ | Do. |
| (5) Same | 3.3 | $NaHCO_3$ | 7.7 | $NH_2SO_3H$ | 7.5 | 1 | Do. |
| (6) Same | 3.3 | $NaHCO_3$ | 7.7 | $NH_3H_2PO_4$ | 6.0 | 1 | Do. |
| (7) Same | 1.0 | (1) | (1) | (1) | (1) | 10 | 11 lumps of resin with largest dimension between ¼ and 1", comprising about 80% of the charge. |
| (8) Same | 4.0 | $Na_2CO_3 \cdot 10H_2O$ | 8.0 | Citric acid | 8.0 | 1 | Complete. |
| (9) Same | 4.0 | $CaCO_3$ | 6.0 | do | 9.0 | 3 | Do. |
| (10) Same | 4.0 | $KHCO_3$ | 10.0 | do | 7.0 | 1 | Do. |
| (11) Same | 4.0 | (1) | (1) | (1) | (1) | 10 | 9 lumps with largest dimension about ½, many smaller lumps, heavy shaft buildup of resin. |
| (12) Same | 4.0 | $NaHCO_3$ | 8.0 | Citric acid | 8.0 | 1 | Complete. |
| (13) Same | 4.0 | $NaHCO_3$ | 8.0 | do | 8.0 | 1 | Do. |
| (14) Same | 1.0 | (1) | (1) | (1) | (1) | 15 | 15/20 lumps bet. ⅛ and ¼" with heavy buildup on stirrer shaft. |
| (15) Same | 1.0 | $NaHCO_3$ | 2.0 | $NaH_2PO_4$ | 2.25 | ½ | Complete. |

1 None.

The data in Table I was obtained by thoroughly mixing the gasogenic agents with the polymers in a mortar. The carbon dioxide-releasing compounds and the acidic compounds were mixed in ratios sufficient to release carbon dioxide from the carbonate, i.e., in ratios of 1:1 equivalents. A volume of water at 75° F., was stirred with a six-blade 1½" diameter turbine-type propeller located centrally and about 1" above the bottom of the container. The mixture was added to the water in amounts which contained 0.5% of the polymer with the above-indicated results being obtained.

TABLE II.—PELLET COMPOSITION

| Polymer of Ethylene Oxide | Carbonate | $CO_2$ Liberating Agent | Number of Pellets | Dispersion Time, min. | Dispersion (at 150° F. of 1% resin in water) |
|---|---|---|---|---|---|
| (1) Same | (1) | (1) | (2) | 10 | 10 particles with largest dimension bet. ¼ and ½" with many particles about ⅟₁₆". |
| (2) Same | $NaHCO_3$ | Citric acid | 6 | 2 | Complete. |
| (3) Same | $NaHCO_3$ | $NH_4H_2PO_4$ | 6 | ½ | Do. |
| (4) Same | $NaHCO_3$ | Maleic Anhydride | 6 | 1 | Do. |
| (5) Same | $NaHCO_3$ | $NaH_2PO_4$ | 6 | 1 | Do. |
| (6) Same | $Na_2CO_3 \cdot 10H_2O$ | Citric acid | 7 | 2 | Do. |
| (7) Same | $NHCO_3$ | do | 6 | 2 | Do. |
| (8) Same | $CaCO_3$ | do | 7 | 4 | Do. |
| (9) Same | (1) | (1) | (2) | 10 | 1 lump about ¼ x ½" with resin bridging ⅛ of stirrer propeller, discontinued. |
| (10) Same | $NaHCO_3$ | Citric acid | 7 | 1 | Complete. |

1 None. 2 2 gm. powder.

The data in Tables III and IV further illustrates the various combinations in accordance with this invention wherein the polymers in the form of powder, may be used in admixture with $CO_2$-releasing compounds and metal carbonates.

TABLE III.—POWDER COMPOSITION

| Polymer of Ethylene Oxide | Carbonate | Parts by Weight | $CO_2$ Liberating Agent | Parts by Weight | Dispersion Time, min. | Dispersion |
|---|---|---|---|---|---|---|
| (1) 3.1 | $NaHCO_3$ | 1.7 | Citric | 1.4 | 3 | Complete. |
| (2) 9.0 | $NaHCO_3$ | 4.0 | Fumaric | 2.0 | 3 | Do. |
| (3) 2.9 | $NaHCO_3$ | 1.7 | do | 1.2 | 1 | Do. |
| (4) 4.0 | $NaHCO_3$ | 8.0 | Phthalic | 8.0 | 2 | Do. |
| (5) 4.8 | $NaHCO_3$ | 8.4 | $Al_2(SO_4)_3 \cdot 18H_2O$ | 11.0 | 2 | Do. |

TABLE IV

| Polymers of Acrylamide (Powder) | Parts by Weight | Carbonate | Parts by Weight | $CO_2$ Liberating Compound | Parts by Weight | Dispersion Time, min. | Dispersion (at 75° F. of 0.5% Polymer in Water) |
|---|---|---|---|---|---|---|---|
| (1) | 1.0 | (1) | (1) | (1) | (1) | 10 | Numerous small lumps with stirrer blade partly covered by polymer build-up encasing dry polymer. |
| (2) | 4.0 | $NaHCO_3$ | 8.0 | Citric Acid | 8.0 | 5 | Complete. Clear solution. |
| (3) | 1.0 | (1) | (1) | (1) | (1) | 10 | Numerous medium to small lumps with polymer bridging stirrer blade. |
| (4) | 4.0 | $NaHCO_3$ | 8.0 | Citric Acid | 8.0 | 1 | Complete. |
| (5) | 1.0 | (1) | (1) | (1) | (1) | 15 | 15 to 20 lumps between ⅛" and ¼" with polymer build-up on stirrer shaft. |
| (6) | 1.0 | $NaHCO_3$ | 2.0 | $NaH_2PO_4$ | 2.2 | 1/2 | Complete. |
| (7) | 1.0 | (1) | (1) | (1) | (1) | 5 | Medium lumps. |
| (8) | 4.0 | $NaHCO_3$ | 8.0 | Citric Acid | 8.0 | 1 | Complete. |
| (9) Reten 205 | 1.0 | (1) | (1) | (1) | (1) | 15 | Lumps between ¼ and ½" with dry interiors, numerous lumps ¼" or smaller, heavy resin build-up on shaft and bridging stirrer blade. |
| (10) Reten 205 | 4.0 | $NaHCO_3$ | 8.0 | Fumaric Acid | 8.0 | 3.0 | Complete dispersion, rapid solution. |

1 None.

NOTE.—Reten 205 is a copolymer of acrylamide containing quaternary nitrogen groups.

It can bse seen that the data in the above tables that in those instances where the polymer was dispersed in the water without the use of a gasogenic agent, solubilizing was incomplete, whereas by utilizing a gasogenic agent, the polymer was easily dispersed with little difficulty in a comparatively short period of time.

In addition, it is obvious that other ingredients in minor proportions may be added to the compositions of this invention, but it is not necessary. For example, minor amounts of various other known water-treating agents including algicides, slimicides, etc. may be incorporated. These compositions may be formed as tablets and supplied periodically depending upon the degree of treatment required. In those instances where tablets are used, it is advisable to form a coating on the outer surface of the tablets by utilizing known water-soluble films such as polyvinyl alcohol films or the like.

Some of the well-known compounds which may be used to control algae, etc. may include, for example, the sulfoxides and disulfoxides. Normally these are used in concentrations ranging from 1 part per million to 100 parts per million depending upon the source of water. In addition to the algicides, the slimicides may be included to inhibit the growth of slime in the water and includes such compounds as the sulfones, e.g., bistrichloromethyl sulfone, bistribromomethyl sulfone, etc.

While this invention has been described with respect to a number of specific embodiments it is obvious that there are other variations and modifications which can be resorted to without departing from the scope of the invention as particularly pointed out in the appended claims.

What is claimed is:

1. A composition for treating water comprising approximately 1.0 part by weight of a water-soluble, high-molecular weight solid polymer and 0.01 to 20 parts by weight of a solid gasogenic agent; said polymer having an average molecular weight in excess of about 100,000 and selected from the group consisting of polymers of ethylene oxide and polymers of monomers characterized by the formula $C=C-R$, wherein R is selected from the group consisting of nitrile, amide, and carboxyl radicals; said solid gasogenic agent comprising an admixture of an acidic compound and a $CO_2$-releasing compound, wherein the $CO_2$-releasing compound is present in the mixture in an amount ranging from about 0.05 to 20 equivalents of the acidic compound; said acidic compound being selected from the group consisting of (a) solid organic acids having $C_2$-$C_{20}$ carbon atoms per molecule, the anhydrides and acid salts thereof, (b) the acid salts of inorganic acids, (c) the alums, and (d) mixtures thereof; said $CO_2$-releasing compound being selected from the group consisting of ammonium carbonates, ammonium bicarbonates, alkali and alkaline earth metal carbonates, alkali and alkaline earth metal bicarbonates, and mixtures thereof.

2. The composition of claim 1 further characterized in that the gasogenic agent is present in an amount ranging from about 0.1 to 10 parts by weight for each part by weight of the polymer.

3. The composition of claim 1 further characterized in that the $CO_2$-releasing compound is present in the admixture in an amount ranging from about 0.1 to 10 equivalents per equivalent of the acidic compound.

4. The composition of claim 1 further characterized in that the gasogenic agent comprises an admixture of the solid organic acids and an alkali metal carbonate.

5. The composition of claim 1 further characterized in that the gasogenic agent comprises an admixture of an acid salt of an inorganic acid and an alkali metal carbonate.

6. The composition of claim 1 further characterized in that the gasogenic agent comprises an admixture of an alum and an alkali metal carbonate.

7. The composition of claim 1 further characterized in that the polymer is a high-molecular weight polymer of ethylene oxide and the gasogenic agent comprises a mixture of citric acid and sodium bicarbonate.

8. The composition of claim 7 further characterized in that the polymer of ethylene oxide has an average molecular weight ranging up to about 20 million.

9. A method of dispersing solid, high-molecular weight polymers in water which comprises adding approximately 1.0 part by weight of said polymer in admixture with 0.01 to 20 parts by weight of a solid gasogenic agent to the water; said polymer having an average molecular weight in excess of 100,000 and selected from the group consisting of polymers of ethylene oxide and polymers of monomers characterized by the formula $C=C-R$, wherein R is selected from the group consisting of nitrile, amide, and carboxyl radicals; said gasogenic agent comprising an acidic compound and a $CO_2$-releasing compound wherein the $CO_2$-releasing compound is present in an amount ranging from about 0.05 to 20 equivalents per equivalent of the acidic compound; said acidic compound being selected from the group consisting of (a) organic acids having $C_2$-$C_{20}$ carbon atoms per molecule, the anhydrides and acid salts thereof, (b) acid salts of inorganic acids, (c) the alums, and (d) mixtures thereof; said $CO_2$-releasing compound being selected from the group consisting of ammonium carbonates, ammonium bicarbonates, the alkali and alkaline earth metal carbonates, the alkali and alkaline earth metal bicarbonates, and mixtures thereof.

10. The method of claim 9 further characterized in that the polymer is a polymer of ethylene oxide having an average molecular weight ranging up to about 16 million.

11. The method of claim 9 further characterized in that the polymer is an acrylic polymer having an average molecular weight ranging up to about 16 million.

12. The method of claim 9 further characterized in that the gasogenic agent comprises an admixture of citric acid and an alkali metal carbonate.

13. The method of claim 9 further characterized in that the gasogenic agent comprises an admixture of fumaric acid and an alkali metal carbonate.

14. The method of claim 9 further characterized in that the gasogenic agent is an admixture of oxalic acid and an alkali metal carbonate.

15. The method of claim 9 further characterized in that the gasogenic agent is an admixture of sodium bisulfite and an alkali metal carbonate.

References Cited

UNITED STATES PATENTS

| 1,450,865 | 4/1923 | Pelc | 252—363.5 X |
| 2,637,536 | 5/1953 | De Ment | 252—363.5 X |
| 3,259,570 | 7/1966 | Priesing et al. | 210—10 X |

MICHAEL E. ROGERS, *Primary Examiner.*

U.S. Cl. X.R.

134—22; 210—54; 252—181, 363.5; 260—29.6, 34.2